United States Patent [19]
Lambert, Jr.

[11] 3,755,917
[45] Sept. 4, 1973

[54] ROTARY SWEEP APPARATUS FOR DRYING WET GRAIN

[75] Inventor: Charles F. Lambert, Jr., Louisville, Ky.

[73] Assignee: Clayton & Lambert Manufacturing Company, Buckner, Ky.

[22] Filed: Apr. 3, 1972

[21] Appl. No.: 240,695

[52] U.S. Cl. .................... 34/179, 34/233, 34/236
[51] Int. Cl. ............................................ F26b 11/12
[58] Field of Search ............... 34/26, 102, 165–179, 34/227, 233; 214/17.80, 17.82, 152; 259/97; 198/217; 98/55

[56] References Cited
UNITED STATES PATENTS

| | | | |
|---|---|---|---|
| 3,309,782 | 3/1967 | Ellis | 34/179 |
| 3,538,618 | 11/1970 | Neuenschwander | 34/102 |
| 3,563,399 | 2/1971 | Shivers | 34/102 |

*Primary Examiner*—Kenneth W. Sprague
*Assistant Examiner*—James C. Yeung
*Attorney*—Arthur F. Robert

[57] ABSTRACT

A rotary sweep duct is mounted in a grain drying bin for rotational sweep movement about the vertical center axis of the bin and fashioned to provide a radially-wide, "rotationally-narrow," vertically-high passageway having an upper or top inlet to receive incoming wet grain and a bottom radially-wide, "rotationally-narrow" slot-like grain outlet extending over the radial width of the perforated floor of the bin. The duct has four vertical walls including (a) inner-axial and outer-peripheral end walls and (b) front and rear radially-wide vertically-high side walls, the lower radial edge of the front wall being closely adjacent the floor, and the lower radial edge of the rear wall being spaced, upwardly from the floor, a predetermined distance corresponding to the desired thickness of the layer of grain to be deposited or formed on the floor.

The incoming wet grain is fed to the upper inlet of the duct and falls gravitationally through the duct which constrains it to pile up on the floor and in the duct in the form of a radially wide "rotationally-narrow" column, the lower end of which rests upon the bin floor. A drive motor outside of the bin rotates the duct forwardly so that the lower radial edge of its rear wall now levels off the lower end of said column at said desired thickness and thus permits the gravitational feed of additional grain from the column in the rotating duct to the floor. Wet grain feed means is provided to supply incoming grain to the upper inlet of the rotary sweep duct at a rate sufficient to maintain said column of grain within the duct.

9 Claims, 9 Drawing Figures

Patented Sept. 4, 1973  3,755,917
2 Sheets-Sheet 1
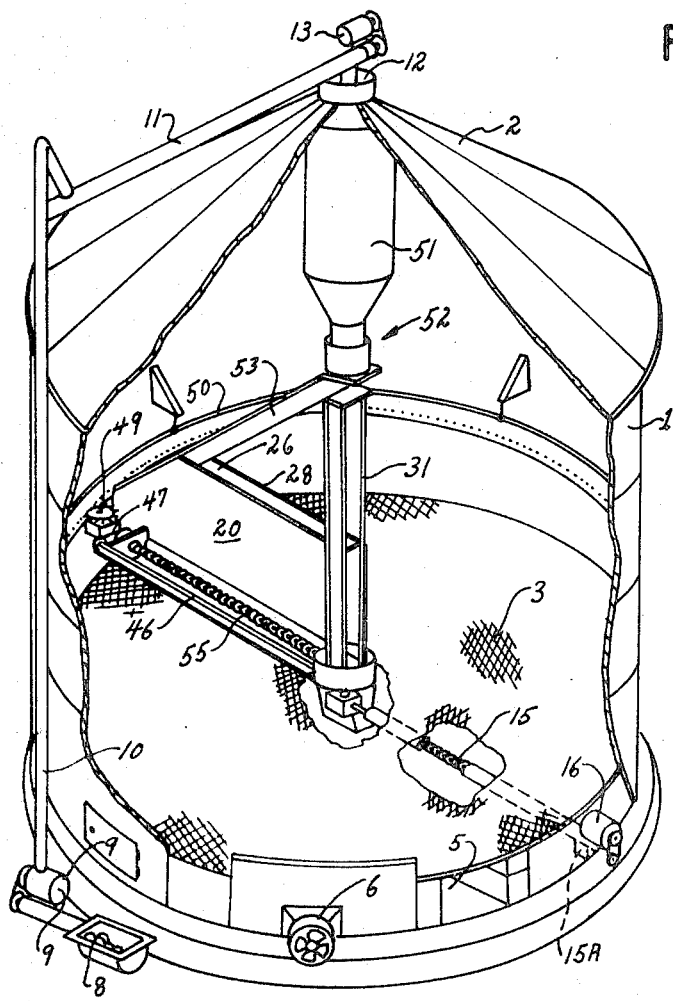
FIG. 1
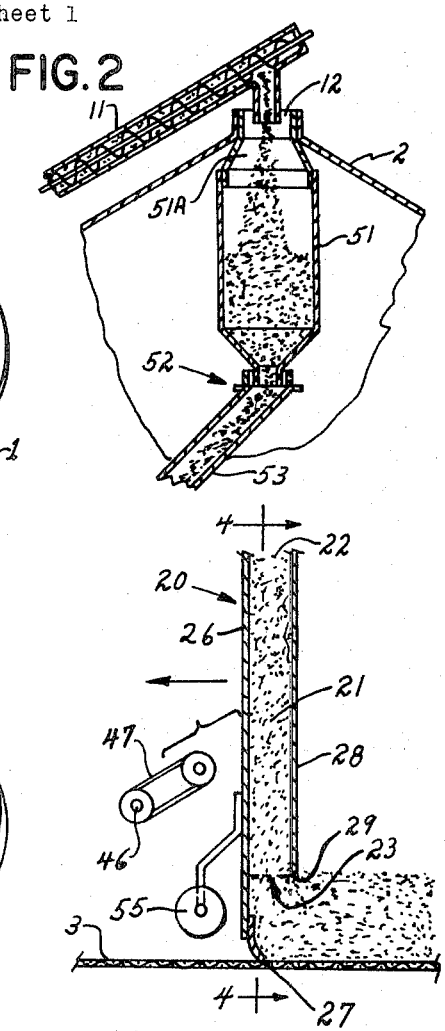
FIG. 2
FIG. 3
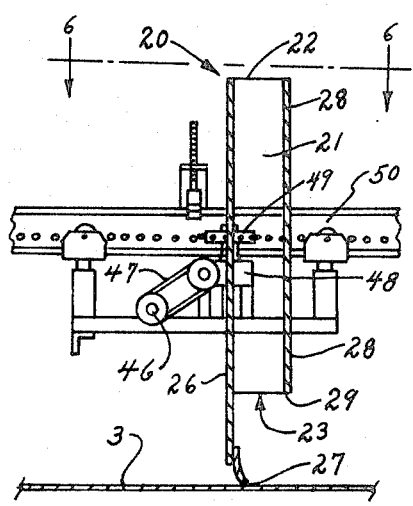
FIG. 5
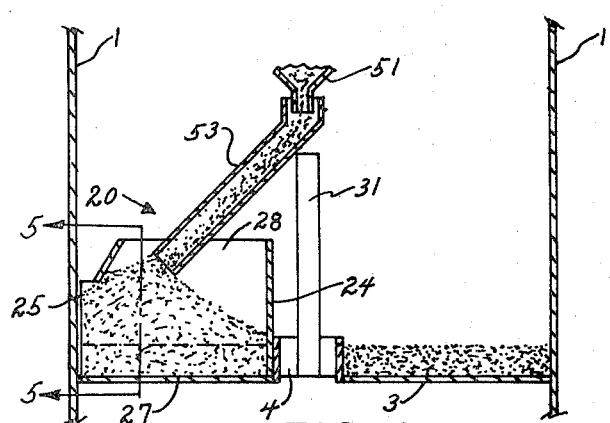
FIG. 4

Patented Sept. 4, 1973 3,755,917

ROTARY SWEEP APPARATUS FOR DRYING WET GRAIN

BACKGROUND OF THE INVENTION

1. Field of the Invention

This invention relates to grain drying apparatus of the continuous rotary sweep type. More particularly, the invention is concerned with an apparatus which operates continuously in a progressive manner not only to deposit a layer of wet grain upon the perforated floor of a cylindrical drying bin but also to dry that layer, form it into a continuous stream and direct that stream into a discharge auger.

2. Description of the Prior Art

Most, if not all, grain drying bins conventionally comprise: a cylindrical upright bin having a centrally-disposed vertical axis; a roof closing its top; a perforated floor having a center discharge hole; means for feeding wet grain to the bin through its roof; a plenum chamber underlying the floor; means for supplying a stream of grain-drying hot air to the plenum chamber under sufficient pressure to force the heated air upwardly through the perforated floor and the grain; and means for removing the dry grain including a discharge auger extending underneath the floor from the center hole radially to a suitable point of discharge.

The Francis U. S. Pat. No. 3,449,840 granted June 17, 1969 discloses a rotary apparatus for drying wet grain in an upright cylindrical bin of the aforesaid perforated floor type. It has a rotary sweep structure in which incoming wet grain is fed to the inner end of one radially extending feed auger, which moves the grain lengthwise along a radial trough in a manner causing that trough to overflow along its radial rear edge and thus deposit grain upon the floor to form a circular layer as the structure rotates. This apparatus also has means for removing the dried grain, including: a radially-extending scoop which scrapes the floor and which, with the completion of the 1st forward revolution of the rotary structure, is operative to pile up a radially-extending bank of dried grain; a retrieving auger mounted on the rotary structure to move said bank of grain radially inward to said center hole through which it discharges gravitationally; and the conventional discharge auger stationarily mounted underneath the floor to receive the dried grain from the center hole and convey it away.

SUMMARY OF THE INVENTION

Objects of the Invention

The principal object of the present invention is to provide a grain drying apparatus which may be easily and quickly incorporated into newly-manufactured and old-installed conventional upright cylindrical bins of the perforated floor type and effectively operated to dry a wet grain crop.

Another important object is to provide a grain drier which feeds grain to the floor at a constant rate regardless of variations in the flow of incoming wet grain.

Another important object of the present invention is to provide a grain drying apparatus which, after a given crop of wet grain has been dried, permits the grain bin to be used for conventional grain storage purposes without removing or otherwise disturbing the drying apparatus and which may thereafter be used to unload portions of the stored grain from time to time for stock feeding purposes or sale through commercial channels.

Another important object of the present invention is to provide a simple drying apparatus which is readily applicable to a wide range of grain drying bins and which is less costly to make, install, operate and maintain and to accomplish all of this without sacrificing other desired characteristics of the presently available grain driers.

STATEMENT OF THE INVENTION

Most of the important objects of this invention are accomplished by using, in place of the rotary sweep feed auger (and associated grain feeding apparatus) disclosed in the Francis U.S. Pat. No. 3,449,840, a rotary sweep duct mounted on the bin for rotary sweep movement about the center axis of the bin and fashioned to provide a vertical passageway having an upper inlet to receive incoming grain and a lower radial slot-like grain outlet extending over the radial width of the said perforated floor section, (1) said duct having vertical walls including (a) inner axial and outer peripheral end walls, (b) a front radial side wall, the lower radial edge of which is closely adjacent the floor, and (c) a rear radial side wall, the lower radial edge of which is spaced upwardly from the floor a distance corresponding to the desired thickness of the layer of grain to be formed on the floor. With this arrangement, when the duct is rotated forwardly, the lower radial edge of said rear wall will level off the lower end of said column at said desired thickness and thus permits the gravitational feed of additional column grain to the floor.

The duct accomplishes another important object of the invention because it permits the rate, at which the incoming wet grain flows, to vary without affecting the constant rate at which it feeds wet grain to the floor. This feature is additionally promoted by connecting the inlet of the duct to a relatively elevated hopper for receiving the incoming grain.

In the present invention, the drive motor and all electrical controls are located outside of the bin so that the structure inside of the bin is of a mechanical nature without electrical components. As a consequence, the bin can also be used as a dried grain storage bin without removing the rotary sweep structure or covering it or otherwise protecting any of its parts from the dried grain in which it will or may be submerged. My arrangement has the further advantage of utilizing the old discharge auger customarily provided under the floor of most if not all old grain bins. Likewise, it permits all of the grain fed to it to be deposited gravitationally upon the floor of the bin where it is within reach of the retrieving auger on the rotary sweep structure. As a consequence, when the last of the grain is fed gravitationally to the floor, the rotary structure will, when rotated 360° thereafter, effect a complete removal of the bin contents.

BRIEF DESCRIPTION OF THE DRAWINGS

The invention is illustrated in the accompanying drawings wherein:

FIG. 1 is a somewhat schematic partly broken perspective view of a bin in which my invention is embodied;

FIG. 2 is a somewhat schematic view showing the incoming wet grain flowing through the roof of the bin and chuting downwardly to the rotary duct;

FIG. 3 is a somewhat schematic view of the rotary duct showing how the grain leaves that duct to form a layer of grain on the floor of the bin;

FIG. 4 is a view corresponding to one taken along line 4—4 of FIG. 3;

FIG. 5 is a fragmentary view taken through the rotary duct structure along a line corresponding to line 5—5 of FIG. 4;

DESCRIPTION OF THE PREFERRED EMBODIMENT

CONVENTIONAL STRUCTURE

Figure 6:
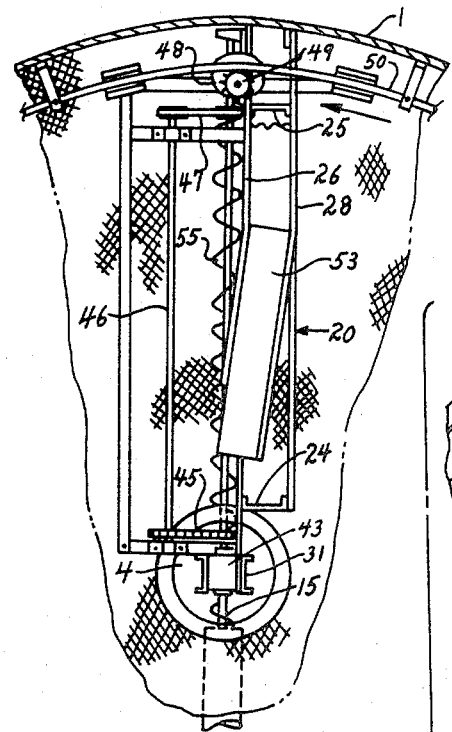
FIG. 6 is a view looking down upon the rotary structure, this view corresponding to one taken along line 6—6 of FIG. 5.

The structure shown in FIG. 1 of the drawing is conventional to the extent that it comprises: a cylindrical upright bin 1 having a centrally disposed vertical axis; a conical roof 2 closing its top; a somewhat elevated perforated floor 3 having a center discharge hole 4; a plenum chamber 5 underlying the elevated floor 3; heater-fan means 6 for supplying the plenum chamber with a stream of air (preferably heated) under sufficient pressure to force its way upwardly through the perforated floor 3 and any layer of grain on it; means for feeding wet grain to the bin through its roof 2, said means including, on the outside of the bin, an auger 8 open at one end to receive the incoming grain, a drive motor 9 for auger 8, an upright auger 10 leading to the roof 2, a roof auger 11 discharging into a centrally disposed bin inlet opening 12 in roof 2, and a drive motor 13 for upright and roof augers 10 and 11; a discharge auger 15 located underneath the floor 3 to receive dried grain falling through center hole 4 and to convey that grain outwardly to a suitable point of discharge; and an outside drive motor 16 for the discharge auger 15.

INVENTIVE STRUCTURE

The inventive structure centers primarily upon the feature of having a rotary sweep duct mounted on the bin for rotary sweep movement about the vertical center axis of the bin and fashioned to provide a vertical passageway having an upper inlet to receive incoming grain and feed it gravitationally to the floor of the bin through a lower radial slot-like grain outlet extending across the radial width of said perforated floor 3.

The inventive structure may be described as a six-element structure comprising: a duct; duct mounting means; duct rotating means; wet grain feed means; dry grain removal or retrieving means; and auger drive means.

DUCT

As seen in FIGS. 3 and 4, the rotary sweep duct 20 is fashioned to provide a radially-wide, "rotationally-narrow" vertically-high passageway 21 having an upper inlet 22 to receive incoming grain and a lower radial slot-like grain outlet 23 extending over and across the radial width of said perforated floor 3. By "rotationally-narrow," I mean that the passageway is relatively narrow in the direction of rotation, which is indicated by the arrow in FIG. 3. In the embodiment shown, the duct has four vertical walls including inner-axial and outer-peripheral end walls 24 and 25, a radially-wide vertically-high front side wall 26, the bottom edge 27 of which is closely adjacent the floor and a radially-wide rear side wall 28, the bottom edge 29 of which is spaced upwardly from floor 3 a distance corresponding to the desired thickness of the layer of grain to be formed on the floor.

DUCT MOUNTING MEANS

Figure 7:
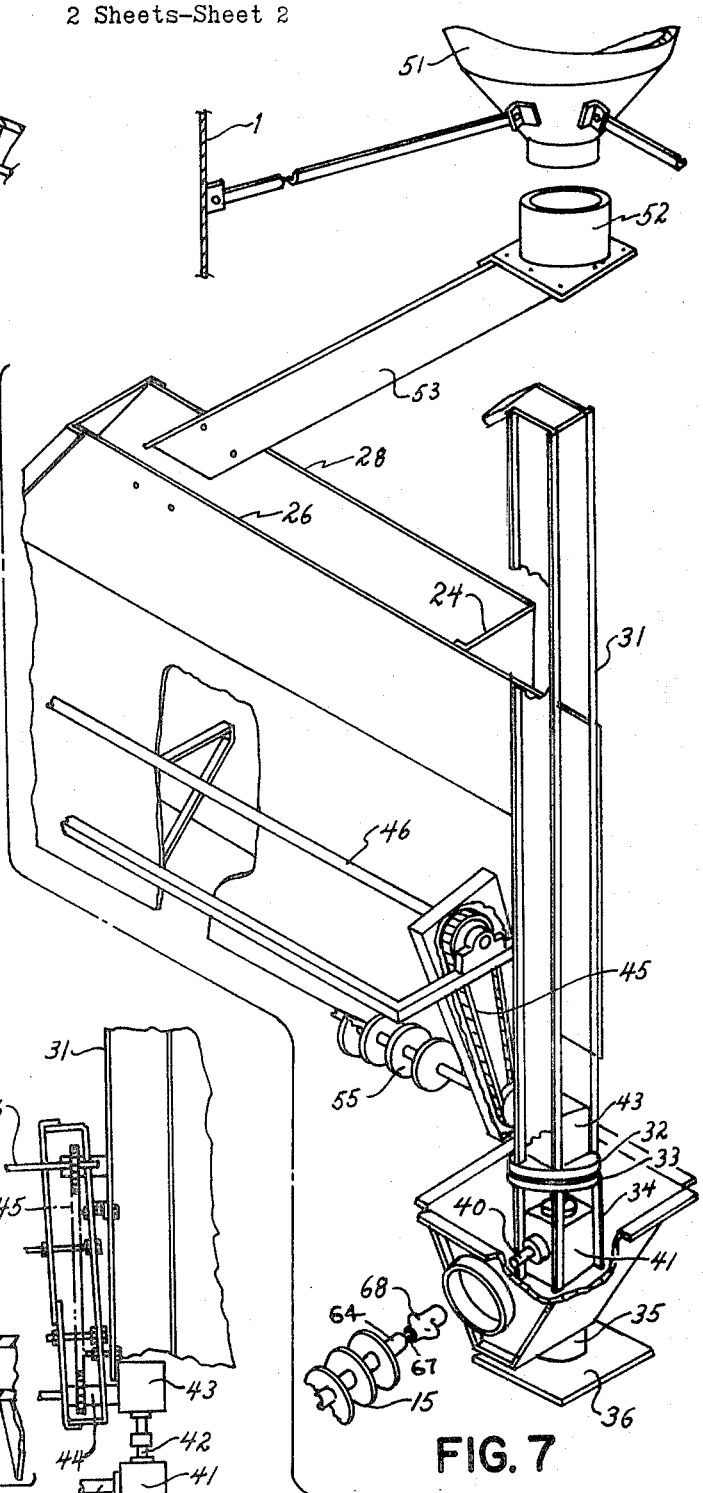
FIG. 7 is a fragmentary exploded view showing the center column structure, the adjacent portion of the rotary duct, and the corresponding driving connection for the retrieving auger and the rotary duct structure.

The duct 20 is mounted on the bin for rotational sweep movement about the axis of the bin. While this may be accomplished in any suitable way, as seen in FIGS. 1, 6 and 7, it is accomplished by mounting the inner axial end of the front side wall 26 upon an elongate or vertically-tall upright hollow column 31, which is centered on the bin axis. The lower end of column 31 terminates in a bearing plate 32 which is rotationally mounted upon a stationary underlying bearing plate 33 at the top end of a fixed bottom base assembly composed of a fixed short upright column 34, supported by a fixed short upright post 35 and a suitably anchored base plate 36.

DUCT ROTATING MEANS

Figures 8, 9:
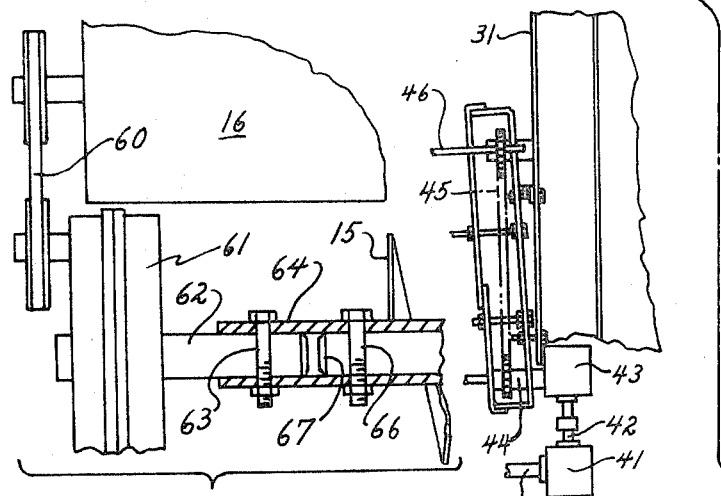
FIG. 8 is a somewhat schematic view of the driving mechanism shown along the center column in FIG. 7.
FIG. 9 is a fragmentary view of an enlarged scale showing the driving connection between the drive motor and the adjacent end of the discharge auger.

The duct 20 may be rotated in any suitable manner by any suitable means. As seen in FIGS. 7 and 8, this drive includes a pair of vertically interconnected lower and upper gear boxes transmitting power to the inner end of a radial shaft, the outer end of which is conventionally connected to rotate a conventional tracking sprocket which rotates the duct 20 by tracking in the perforations of a conventional ring gear fixedly mounted on the interior wall of the bin 1 in concentric relation to the bin axis. More particularly, this power transmitting train includes: the input shaft 40 of a lower gear box 41 within the stationary upright column 34 at the lower end of rotary column 31; an output shaft 42 extending from lower gear box 40 upwardly into the rotary column 31; an upper gear box 43 in rotary column 31, this box receiving output shaft 42 as its input shaft and providing horizontal output shaft 44; a sprocket chain 45 connecting the upper gear box output shaft 44 to the outwardly extending radial shaft 46; a belt drive 47 (see FIGS. 1, 5) connecting shaft 46 through a gear box 48 to the tracking sprocket 49, the teeth of which track in openings in ring gear 50 which is fixedly mounted on the inner wall of the bin.

GRAIN FEED MEANS

The conventional means for transmitting incoming wet grain to the interior of the bin through roof opening 12 may be connected to the upper centrally disposed portion of the inlet slot 22 of the duct 20 in any suitable way. As shown in FIG. 1, this connection includes a hopper 51 having a bottom outlet concentric to the axis of the bin, a rotary coupler 52 connecting the outlet of the hopper to the upper end of a declining slide trough or duct 53 which slopes downwardly to and connects with the upper inlet 22 of the duct.

GRAIN REMOVAL MEANS

The means for removing dried grain includes: a retrieving auger on the rotary sweep structure; and a discharge auger under the floor.

The retrieving auger 55, as seen in FIGS. 1, 3, 6–7, functions in the same way as the retrieving auger in the Francis patent. Acordingly, it is mounted on the rotary sweep structure at the bottom margin of its front side with an auger space between it (auger 55) and the front wall 26 of the duct 20. This retrieving operation moves the dry grain radially inward along said auger space and discharges the dry grain into the center hole 4. The retrieving auger 55 may be and preferably is driven directly from the output shaft 44 of the upper gear box 43 in the lower end of rotary column 31.

As previously stated, the discharge auger 15, located underneath the perforated floor 3, is conventional equipment conventionally arranged to receive dried grain falling through center hole 4 and convey that grain outwardly to a suitable point of discharge outside of the bin where it passes downwardly through the stem of a discharge tee 15A. The outer end of the discharge auger 15 projects outside of the bin where it is driven by a variable speed drive motor 16.

AUGER DRIVE MEANS

We have previously stated that the duct rotating means includes the variable drive motor 16. The driving connection between the variable drive motor 16 and the rotary duct is made through the discharge auger 15. The same driving connection is used in the drive of both augers, the discharge auger 15 and the retrieving auger 55.

To drive the discharge auger 15, the variable speed drive motor 16, at the outside end of auger 15, is connected (see FIG. 9) through belt 60, gear box 61, stub shaft 62 and bolt 63 to the hollow center pipe or tube 64 of the discharge auger 15. As a result of this positive connection, the discharge auger 15 will rotate whenever the drive motor rotates.

To drive the retrieving auger 55, another bolt 66 is used to connect the hollow center tube 64 of the discharge auger 15 to the outer end of an elongate core shaft 67, which passes inwardly through hollow tube 64 and terminates near the central vertical axis of the bin. The core shaft 67 has its inner end connected, through shaft coupler 68, to the input shaft 40 of the lowermost gear box 41. The latter box 41 connects through shaft 42, upper gear box 43 and its output shaft 44 directly to the retrieving auger 55.

Before passing, we note that the foregoing drive connection running from the drive motor 16 through core shaft 67, lower and upper gear boxes to shaft 44, is used in the rotating means for duct 20 by connecting gear box shaft 44 to the radial shaft 46 connected with tracking sprocket 49. So long as bolt 66 connects discharge auger tube 64 to the core shaft 67 within it, the rotation of the drive motor 16 will effect the rotation of the discharge auger 15, the retrieving auger 55 and the rotary duct structure.

OPERATION

In operation, the incoming wet grain is fed to the open trough-like section of auger 8 and from there directed through vertical auger 10 and roof-auger 11, roof inlet 12, hopper 51, rotary coupler 52 and the sloping covered duct 53 of the rotary sweep structure into the inlet 22 of its rotary duct 20. The inlet 22 preferably is centrally disposed on the upper end of duct 20. The initial portion of the incoming grain falls through the duct onto the perforated floor 3. Then it is allowed to pile up in the duct until its angle of repose is large enough to embrace the full spread of the duct from one vertical end wall to the other. Preferably, the wet grain is allowed to pile up within the duct until its angle of repose rises enough to intersect the end walls of the duct at points elevated substantially above the duct outlet 23.

Now, the variable drive motor 16 is energized to start rotating the rotary structure (and the retrieving and discharge augers 55, 15) at constant speeds which have been adjusted to desired predetermined values within operative ranges.

Accordingly, when the motor 16 is energized with the incoming wet grain piled up within the duct 20, the lower radial edge 29 of the rear radial side wall 28 of the duct 20 will level off the bottom end portion of the column of grain as the rotary structure rotates and thereby form a progressively lengthening layer of grain extending circularly about the axis of the bin and radially across the full width of the floor. The discharge and retrieving augers will operate through the 1st revolution without performing any work since there isn't any dried grain to be removed. When the 1st full circle of rotation has been completed, the grain normally will not be properly dried even though it may have been subjected to the flow of drying air. However, it could now be dried as a batch and removed. Preferably, the drier is operated during the first two revolutions exactly the same as it is operated during subsequent revolutions except, during the first revolution, the sweep unit is rotated at its highest speed and the flow of heated drying air is cut off, and, during the second revolution, the sweep unit is rotated at its normal relatively low speed while the wet grain (deposited during the first revolution) is removed, mixed with the incoming wet grain and re-cycled. Thereafter the grain removed will be dried properly; hence, the operation of the apparatus will be continuous.

After the use of the device as a drier is over, the bin may be readied for use as a grain storage bin by turning the rotary structure to an angular position which renders belt 47 accessible through one of the several access doors usually provided, only one such door being shown adjacent the motor 9 in FIG. 1, and then removing the belt. Now the dry grain to be stored is simply poured into the bin through the roof inlet 12. From here the grain passes downwardly until it fills the duct 20 structure, the chute 53 leading thereto and the hopper 51. By continuing to feed grain through the roof, the grain will overflow the open upper end of hopper 51, discharge into the bin through openings 51A and thus start filling the space within the bin outside of the rotary duct structure. This operation can proceed until the dry grain fills the bin to a desired level. While the dry grain within the filled bin submerges the mechanical structure, no harm is done because the electrical system for energizing the variable speed motor 16 and for controlling its operation is entirely outside of the bin.

The word "grain" is used in the claims to promote clarity and not for the purpose of restricting the claims. Accordingly, it will be understood that the apparatus defined by the claims may be used for the drying of other materials, such as garbage, manure pellets, wood chips, etc.

It will also be appreciated that the bottom radial edge of the rear wall of the duct functions as a means on the rotary structure to level off the layer of grain deposited on the floor of the bin at a desired thickness. The drive means includes one motor for three drive trains wherein: the first drive train interconnects the shaft of the drive motor with the outer end of the hollow center pipe 64 of the discharge auger 15; the second drive train interconnects the end of the first drive train, that is, the outer end of the discharge auger pipe 64, with the inner end of the retrieving auger 55; and the third drive train interconnects the inner end of the retrieving auger shaft with the ring gear tracking sprocket 49 through belt 47 at the outer end of the third drive train.

In removing dry grain from storage, only the 1st drive train is initially used, hence, bolt 66 is removed. The first drive train is used to remove dry grain so long as such grain will flow gravitationally to the discharge auger 15. When such flow ceases, bolt 66 is restored to render the first and second drive trains operative to remove grain. Their use continues so long as the grain will flow gravitationally to the retrieving auger 55. When that flow ceases, the belt 47 is restored to render all 3 drive trains operative. The 1st two trains continue to effect the removal of the residue grain in the bin while the third train rotates the rotary sweep unit.

Having described my invention, I claim:

1. An apparatus for drying wet grain in a bin of the type having a vertical axis and a floor containing a center hole and a surrounding circular section, which is centered on the vertical axis of the bin, which is operative to support a layer of grain extending lengthwise circularly about said axis and widthwise from the vicinity of said axis radially outwardly across the width of said circular section, and which is perforated to accommodate a stream of grain-drying gas flowing upwardly through the floor and grain layer, comprising:
   A. a rotary sweep structure mounted on the housing for rotary movement about said vertical axis and fashioned to provide a duct presenting a vertical passageway with an upper inlet to receive incoming grain and a lower horizontal slot-like grain outlet extending over the radial width of and spaced upwardly from the said perforated floor section;
   B. means for feeding incoming grain downwardly through the upper inlet and lower outlet of said rotary sweep duct to deposit a radially wide layer of grain on said perforated floor;
   C. means for rotating said rotary sweep duct forwardly to lengthen said layer about said vertical axis; and
   D. means on said rotary structure to level off said layer at a desired thickness.

2. The apparatus of claim 1 including:
   A. a covered chute having its upper end centered on said axis and its lower end positioned to discharge into the upper inlet of said duct; and
   B. means mounting said covered chute on said rotary sweep structure for rotation therewith about said axis.

3. The apparatus of claim 1 wherein:
   A. the vertical passageway of said duct provides space to house a column of incoming grain extending from said grain deposit upwardly through said lower outlet.

4. The apparatus of claim 3 wherein:
   A. the walls of said duct include front and rear vertical side walls each having a bottom radially-extending horizontal edge;
   B. said level off means includes the bottom radially-extending horizontal edge of said rear wall of said duct,
      1. said rear bottom edge being spaced upwardly from the floor a distance corresponding to the desired thickness of said layer of grain.

5. The apparatus of claim 4 wherein:
   A. the bottom radially-extending horizontal edge of the front wall of said duct is arranged closely adjacent the floor so that it functions during rotation to scrape the grain in front of it into a radially-extending bank; and
   B. grain removal means including
      1. a retrieving auger positioned above the floor to move the grain in said bank radially inward to said center hole through which it discharges; and
      2. a discharge auger positioned below the floor to receive said discharging grain and convey it outwardly.

6. The apparatus of claim 5 wherein:
   A. said rotary sweep structure includes
      1. a hollow structural support column centered on said vertical axis of the bin and comprising
         a. a lower rigidly mounted stationary upright section having its upper end terminating at a level in the vicinity of said floor, and
         b. a relatively elongate upright section rotationally mounted on the top of said lower upright section to extend therefrom upwardly through a substantial portion of the interior of said bin.

7. The apparatus of claim 6 wherein:
   A. said discharge auger has a hollow center pipe; and
   B. said apparatus includes drive means for said discharge and retrieving augers comprising
      1. a motor located outside of said bin, said motor having a drive shaft,
      2. a 1st drive train interconnecting said motor drive shaft with the outer end of the hollow center pipe of said discharge auger for discharge-auger drive purposes,
      3. a 2nd drive train interconnecting said discharge auger pipe with said retrieving auger for retrieving-auger drive purposes, including
         a. a core shaft within said discharge auger,
         b. means connecting the outer end of the core shaft with the adjacent end of said discharge-auger pipe,
         c. a power transmitting connection centered in said structural support column and arranged to present an input shaft below the floor and an output shaft above the floor,
         d. means connecting the inner end of the core shaft with said input shaft, and
         e. means connecting said output shaft with the inner end of said retrieving auger.

8. The apparatus of claim 7 wherein said duct rotating means includes:
   A. a ring gear mounted on the inner wall of said bin, said ring gear having an endless series of tracking perforations;

B. a third drive train interconnecting said second drive train with said ring gear, said third drive train including
1. a drive sprocket mounted to track in said ring gear perforations,
2. a sprocket drive shaft having an inner end in the vicinity of the upright rotary section of said structural support column and an outer end in the vicinity of said sprocket,
3. means connecting said output shaft with said sprocket drive shaft for shaft driving purposes, and
4. means connecting the outer end of said sprocket drive shaft with the sprocket for sprocket driving purposes.

9. The apparatus of claim 1 including:
A. a hollow structural support column centered on said vertical axis of the bin and comprising
1. a lower rigidly mounted stationary upright section having its upper end terminating at a level in the vicinity of said floor, and
2. a relatively elongate upright section rotationally mounted on the top of said lower upright section to extend therefrom upwardly through a substantial portion of the interior of said bin; and
B. means mounting the duct of said rotary sweep structure upon the rotational upper section of said structural support column.

* * * * *